United States Patent [19]
Gwin et al.

[11] Patent Number: 4,957,139
[45] Date of Patent: Sep. 18, 1990

[54] LOW-NOISE NOZZLE VALVE

[75] Inventors: Hal S. Gwin, Madison; James R. Aaron, Athens, both of Ala.

[73] Assignee: The United States of America as represented by the Administrator of the National Aeronautics and Space Administration, Washington, D.C.

[21] Appl. No.: 404,290

[22] Filed: Sep. 7, 1989

[51] Int. Cl.⁵ .................. F16K 3/32; F16K 37/00; F16K 3/316
[52] U.S. Cl. ............................ 137/556; 251/212
[58] Field of Search ............... 251/212, 326; 137/556

[56] References Cited

U.S. PATENT DOCUMENTS

| | | | |
|---|---|---|---|
| 2,578,056 | 12/1951 | French | 251/212 X |
| 3,353,572 | 11/1967 | Anderson et al. | 251/212 X |
| 4,214,605 | 7/1980 | Hardgrave | 137/556 X |
| 4,253,487 | 3/1981 | Worley et al. | 251/212 X |

FOREIGN PATENT DOCUMENTS 651717  10/1937  Fed. Rep. of Germany ...... 251/326

*Primary Examiner*—Arnold Rosenthal
*Attorney, Agent, or Firm*—William J. Sheehan; John R. Manning; Jerry L. Seemann

[57] ABSTRACT

A low-noise, variable discharge area, valve (10) is constructed having opposed recesses (46, 48) within which a pair of gates (42, 44) are slidably disposed. Each of the gates (42, 44) is provided with upstream edges (50) having a radius thereon, the radius enabling smooth, accelerated, low-noise flow therebetween. The gates (42, 44) are further provided with tracks (62, 64) along each side, which in turn slide along splines (66) set in side walls (54, 55) of the valve (10). A threaded rod (80) which rotates in a threaded insert (82) in a rear wall of each of the gates (42, 44) serves to move the gates within their respective recesses.

6 Claims, 4 Drawing Sheets

LOW-NOISE NOZZLE VALVE

ORIGIN OF THE INVENTION

The invention described herein was made by employees of the United States Government and may be manufactured and used by or for the Government for Government purposes without the payment of any royalties thereon or therefor.

TECHNICAL FIELD

This invention relates generally to adjustable valves and valving mechanisms for providing variable flow rates at different pressures therethrough, and more particularly to such a valve wherein a pair of opposed gates disposed normal to flow for control without creating turbulence or flow separation downstream therefrom.

BACKGROUND OF THE INVENTION

In water flow testing, it is important that the flow entering and leaving the test section or model be as noise-free as possible. Due to the high speed of sound in water (approximately 5,000 feet per second), the flow noise can cause pressure fluctuations in the test section which unfavorably disturb test readings occurring therein. This noise may be caused by turbulence, flow separations, flow angularity, or a combination of these factors anywhere in the piping system. Thus, it is desirable that the test facility create a minimum of flow noise that will interfere with noise created by the test model.

One such instance where noise in the test facility is of concern is in testing the complex internal flow fields of the hot gas manifold of a rocket engine, such as the Space Shuttle main engine. During operation, this manifold operates under extreme conditions and requires a certain amount of back pressure to function at peak efficiency. During testing, water flow through this manifold can have velocities as high as 150 feet per second and at a flow rate of 5,000 gallons per minute. In the past, one of the methods for providing the required back pressure involved using a flexible rubber collar making an orifice centered therein and a constrictive band around the exterior of the collar. The collar was positioned in the flow downstream the manifold being tested, and when it was desired to impart selected back pressure to the manifold, the band was tightened, reducing the diameter of the orifice the flow passed through. One of the problems with this collar, however, was that the rubber it was composed of was flexible enough to be drawn into the vacuum downstream of the venturi effect caused by the orifice which overly constricted flow and created an abnormal flow pattern through the collar, in turn causing noise which would propagate upstream to the test model. This situation, in some instances, was so extreme that excessive back pressure resulted in possible model damage.

To overcome these problems, applicants have provided a valve that smoothly accelerates flow therethrough and discharges the high velocity jet into a dump tank, virtually eliminating flow noise which may propagate upstream and disturb readings taken from the test model. Further, this valve is adjustable from near closed to fully open flow positions, enabling it to provide a selectable back pressure and flow rate to the hot gas manifold or model being tested.

It is, therefore, an object of the present invention to provide a low noise valve that smoothly accelerates fluid flowing therethrough and further provides selected back pressure and flow rate upstream from the valve.

SUMMARY OF THE INVENTION

In accordance with this invention, a low noise, variable discharge area, split gate valve is constructed having a housing with a fluid entrance opening and a fluid exit opening aligned about a common axis. The housing is also provided with a pair of opposed, elongated recesses, these recesses each having a gate slidably disposed therein. The gates are each provided with an upstream edge having a radius thereon for enabling smooth fluid flow acceleration therebetween and are each further provided with apparatus for moving the gates within their respective recesses.

BRIEF DESCRIPTION OF THE DRAWINGS

The foregoing and additional objects, as well as the various novel features which are characteristic of the present invention, will be understood more clearly and fully from the following detailed description and from the recital of the appended claims taken in conjunction with the accompanying drawings, in which:

DESCRIPTION OF THE PREFERRED EMBODIMENT

Figure 1:
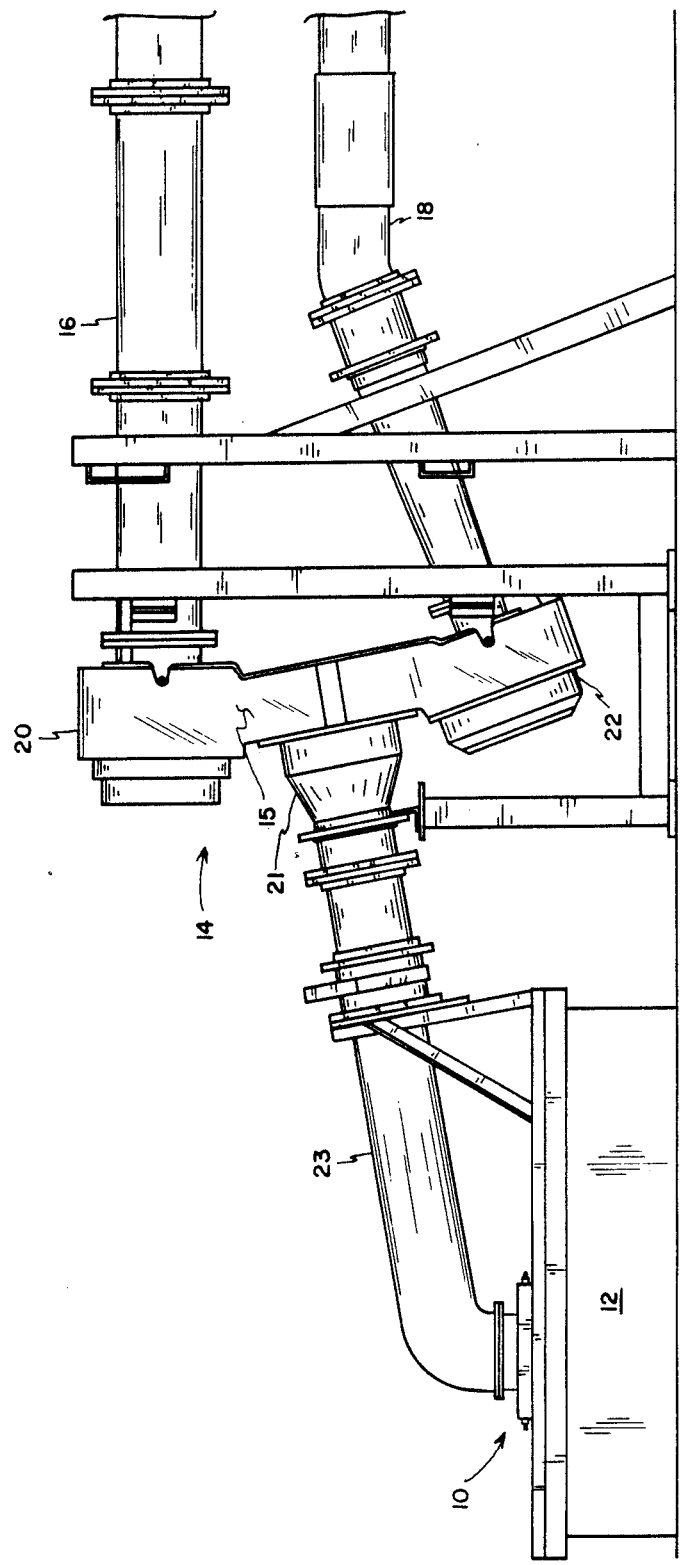
FIG. 1 diagrammatically illustrates the valve of the present invention as it is used in a test facility for simulating the turbine exchaust of a hot gas manifold of typical rocket engines (Space Shuttle main engine shown).

Referring initially to FIG. 1, and in accordance with the present invention, a valve 10 is shown mounted in the top of an open catch tank 12 disposed for receiving water or other fluid typically used for simulating the complex flow in a hot gas manifold 14 and related components of a rocket engine (not shown). Typically, for flow visualization purposes, manifold 14 is constructed of a transparent material, such as a polycarbonate or acrylic, in order to observe internal flow through the manifold. As shown, feed pipes 16 and 18 feed the test fluid from a storage tank (not shown) to fuel side 20 and oxidizer side 22, respectively, of hot gas manifold 14. These two flows are pumped to the injector (not shown) of the hot gas manifold where they are injected into a simulated full scale combustion chamber 21. Chamber 21 is connected to a fluid exhaust pipe 23, in turn coupled to valve 10 mounted in the upper portion of catch tank 12. Valve 10 is mounted in tank 12 as described in order to direct fluid flow therefrom without having any downstream piping from the valve which otherwise would cause the flow to separate or present other disturbances that could generate noise and propagate upstream through valve 10 and to the model.

Figure 2:
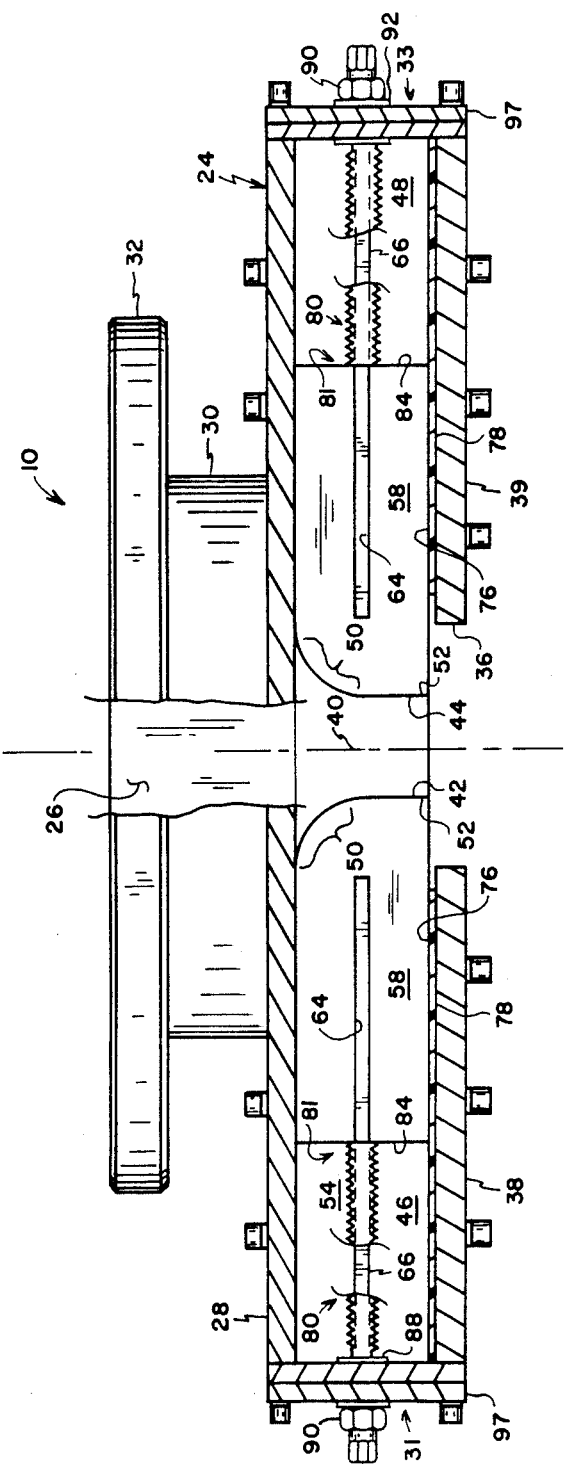
FIG. 2 is a sectional view taken along line 2—2 of FIG. 3.
Figure 3:
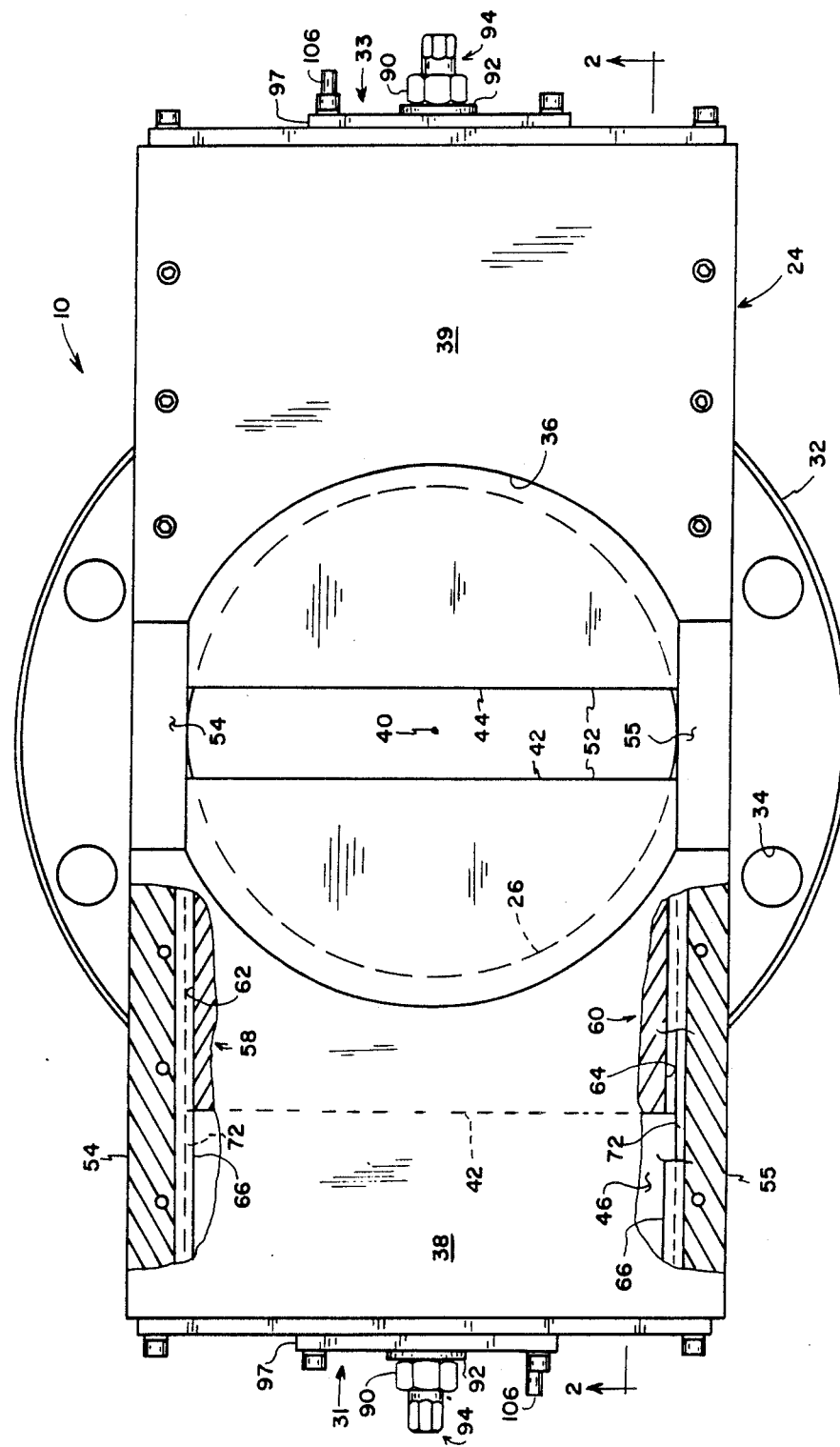
FIG. 3 is a view of the discharge side of the valve.
Figure 4:
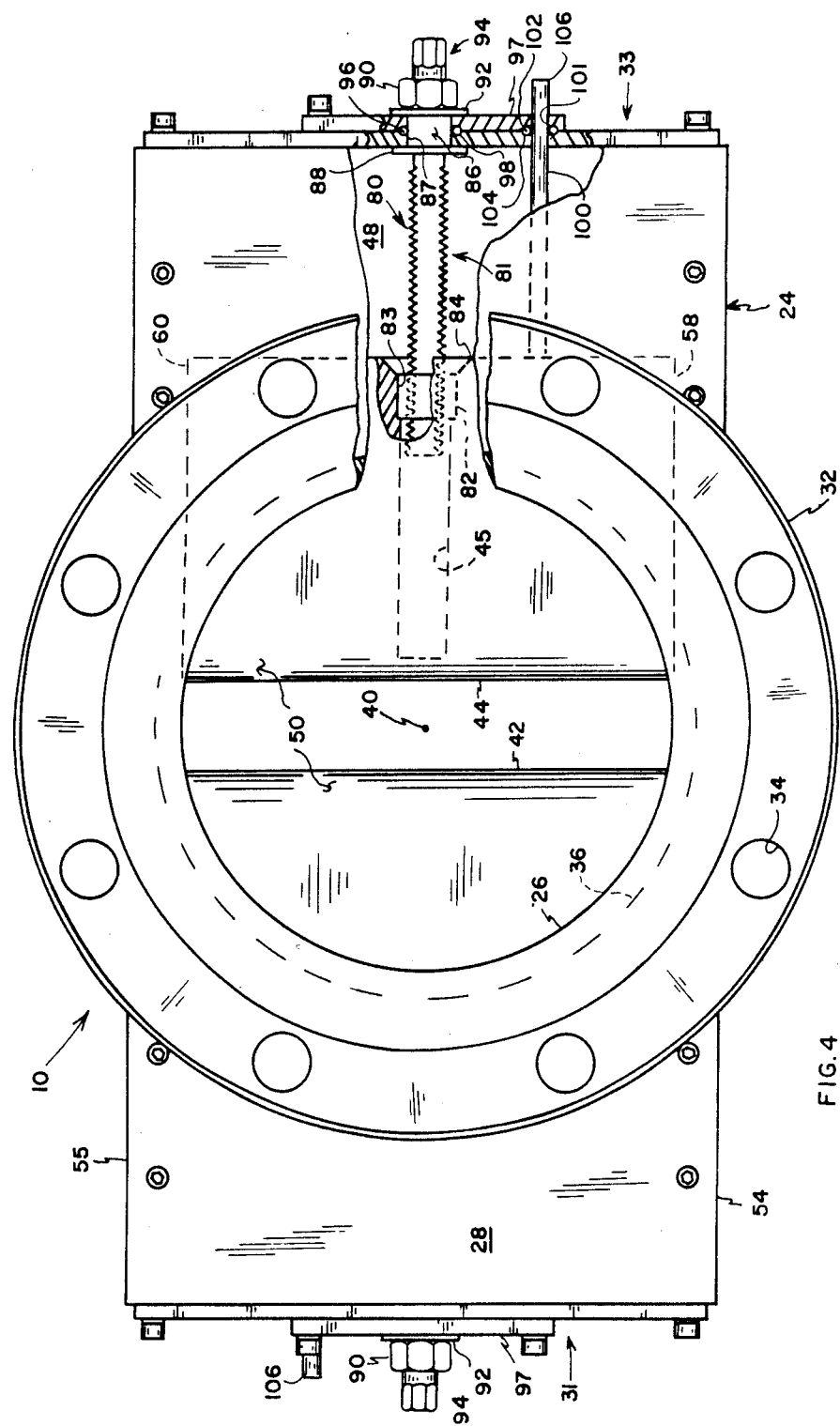
FIG. 4 is a view from the intake of the valve, with portions cut away to reveal details relating to its construction.

Referring now to FIGS. 2, 3, and 4, which show construction details of valve 10, it is seen that the valve is housed in a generally rectangular housing 24 having an interior disposed for smooth passage of fluid therethrough. Housing 24 may be constructed of components including side walls 54 and 55, top and bottom walls 28, 38, and 39, respectively, and end walls 31 and 33. Alternately, housing 24 may be constructed integrally from a single piece of material, being case or machined therefrom. An entrance opening 26 is centrally positioned on top side wall 28 of housing 24, with this opening being provided with a short standoff section 30 (FIG. 2) having a flange 32 thereon. Flange 32 has a series of spaced openings 34 (FIGS. 3 and 4) for conveniently mounting the entrance or inlet opening 26 of valve 10 to a system of piping such as that shown in FIG. 1. A larger exit opening 36, positioned in opposite bottom side walls 38 and 39 of housing 24, is aligned about a common axis 40 (FIGS. 2 and 3) with entrance opening 26 and is not provided with any means for mounting piping thereto as this would tend to create separated flow and the attendant noise. The test fluid is discharged through exit opening 36 but, because of its larger diameter, the stream of fluid does not contact sides of opening 36, as will be further explained.

For providing variable back pressure and smooth flow through valve 10, a pair of opposed, facing, sliding gates or valving members 42 and 44 are slidably fitted into opposed recesses 46 and 48, respectively (FIGS. 2, 3, and 4). Gates 42 and 44, as shown in FIG. 2, are each provided with an upper, upstream edge being contoured with a radiused region 50 which presents a gradually decreasing area to the flow so as to smoothly accelerate fluid flowing between the gates. A downstream region 52 of each gate is disposed parallel to the flow and serves as a discharge port, with the fluid stream issuing therefrom having a rectangular cross section and passing between the gates and out exit opening 36 in a linear, accelerated condition with no obstructions, corners, protrubances, or other anomalies which could otherwise interfere or redirect the flow, causing unwanted noise that would propagate upstream. Sides 54 and 55 (FIG. 3) of housing 24 are tangent to the inside diameter of inlet pipe or standoff 30 and opening 26 to prevent disturbances to the inlet flow.

For providing smooth linear motion of gates 42 and 44 within recesses 46 and 48, sides 58 and 60 of each of gates 42 and 44 (only one shown in FIG. 3) are each provided with grooved regions 62 and 64 which serve as a track into which a brass spline 66 is slidably disposed to provide support for the gates when they are extended toward axis 40. Likewise, sides 54 and 55 of housing 24 are provided with grooves 72 (FIG. 3) for mounting splines 66 therein. Typically, splines 66 are fixed into grooves 72, as by a press fit or adhesive, allowing gates 42 and 44 to slide along splines 66. Additionally, sheets 76 of Teflon TM (FIG. 2), or similar material having a low coefficient of friction, are secured to a lower inner surface 78 of bottom walls 38 and 39 of recesses 46 and 48, allowing near frictionless movement of the gates over these surfaces.

For smoothly ingressing and egressing gates 42 and 44 within recesses 46 and 48, and as shown in FIG. 4, shafts 80, having a threaded portion 81, are threaded into a threaded insert 82 set in a countersunk opening 83 located in rearward portion 84 of each of gates 42 and 44. Opening 83 is countersunk to allow convenient press fitting of insert 82 into opening 83, the insert being held therein by an interference fit. A relief bore 45 axially aligned with opening 83 provides clearance for shaft 80 when the gates are withdrawn away from axis 40. A bushing 86 having a flange 88 is rigidly attached, as by silver soldering, to shaft 80 such that flange 88 is disposed as a stop against the interior side of end walls 31 and 22 when bushing 86 is inserted in an opening 87 of end walls 31 and 33. A brass washer 92 bears against an exterior end of bushing 86 and is clamped thereagainst by a nut 90 threaded onto a threaded portion of shaft 80 adjacent end 94 of shaft 80. This arrangement serves to longitudinally fix shafts 80 in end walls 31 and 33 while allowing the shafts to be rotated, moving gates 42 and 44 within recesses 46 and 48. This rotation is accomplished by configuring ends 94 of shafts 80 as a nut, enabling a tool, such as a socket fitted to a ratchet, air tool, or other rotational means, to be fitted thereto, readily enabling rotation of shaft 80, moving the associated gate in or out a selected distance. Alternately, a motor drive or a stepping motor (not shown) may be coupled to ends 94 of shafts 80 for automated or semi-automated operation of valve 10. Bushing 86 extends through and is sealed against leakage by an O-ring 96 seated in a seal plate 97 having a seal channel 98, with plate 97 being mounted as shown to end walls 31 and 33 of recesses 46 and 48.

For providing a visual indication of the position of gates 42 and 44, a rod fitted into rearward portion 84 of the gates extends outward through openings 101 in end walls 31 and 33 and through seal plate 97. An O-ring seal 102 is set as described for bushing 86 in a seal channel 104 in plate 97 and seals rod 100 against leakage. To determine retraction of the gates away from axis 40, rod 100 may be measured directly or provided with graduations thereon that indicate retraction of the respective gate from a fully closed position. Rods 100 may be constructed of a length such that, when the gates are fully closed (minimum flow area), ends 106 of rods 100 are essentially flush with seal plates 97. Or, as contemplated by the present invention, the rods may be of such a length so that when the ends thereof are flush with seal plate 97, the gates are spaced slightly apart. This is a safety feature that prevents excessive back pressure building up upstream the valve if it is inadvertently closed during operation. Alternately, a flange-type stop (not shown) may be constructed onto ends 106 of rods 100 to abut against seal plate 97 and acts as a positive stop for gates 42 nd 44, maintaining them in a slightly retracted position from axis 40.

In operation, gates 42 and 44 of valve 10 are fully opened and the supply pump (not shown) energized to pump fluid to hot gas manifold 14 via feed pipes 16 and 18. Initially, fluid passes between gates 42 and 44 unobstructed to establish a selected flow through the hot gas manifold or model, after which gates 42 and 44 are moved toward axis 40 (by turning end 94 of shaft 80) to present a desired back pressure to prevent cavitation in high velocity areas of the manifold at selected power level simulations. The back pressure is determined by a number of pressure sensors (not shown) located throughout the downstream piping from the manifold and in the manifold itself, with the back pressure being monitored while adjusting gates 42 and 44. Thus, simulated power levels may be varied and gates 42 and 44 adjusted to maintain selected back pressures at the various simulated power levels of the manifold. In this manner, low pressure regions which cause cavitation and other flow disruptions in the manifold may be identified and corrected.

Having thus described our invention and the manner of its use, it will be understood that various incidental changes and modifications may be resorted to as fairly come within the scope of the appended following claims.

What is claimed is:

1. A low-noise, variable discharge area, split gate valve comprising:
- a valve housing having a fluid entrance opening and a fluid exit opening, said openings being aligned about a common axis;
- a pair of opposed, elongated recesses in said housing, with said axis passing therebetween, with each interior side of each said recess provided with a spline longitudinally disposed therein, and each said recess having an end wall;
- facing gates movably disposed in each recess, each said facing gate having a forward edge provided with a radiused upstream region for smoothyl accelerating fluid passing therebetween;
- a groove longitudinally disposed on each narrow side of said gates and disposed to slidably receive the splines, and a sheet of material having a low coefficient of friction disposed on a lower surface of each said recess adjacent to said exit opening for enabling smooth movement of the gates in said recesses; and
- means for moving each said gate inward or outward with respect to said axis, thereby closing or opening said valve.

2. A valve as set forth in claim 1 wherein said means for moving each said gate comprises:
- a threaded opening in a rearward portion thereof; and
- a shaft threaded at one end and longitudinally fixed in said end walls of said recess and having an opposite end extending therethrough, said shaft disposed for rotatably engaging said threaded opening, and said opposite end being provided with a nut for receiving a tool for rotating said shaft;
- whereby, as said shaft is rotated, said gate ingresses or egresses in said recess.

3. A valve as set forth in claim 2 comprising a rod set in a rearward portion of each said gate and extending through said end wall of each said recess, said rod being of a length such that when said rod is flush with an exterior of said end wall, said gate is spaced from said axis.

4. A valve as set forth in claim 2 comprising a rod set in said rearward portion of each said gate and extending through said end wall of each said recess, whereby that portion of each said rod extending beyond each said end wall provides an indication of distance of each said gate from said axis.

5. A valve as set forth in claim 4 wherein said indicia means comprises a rod set in said rear wall of each said gate and sealably extends through said rear wall of each said recess, whereby that portion of said rod extending beyond said recess end wall provides an indication of distance of each said gate from said axis.

6. A test fixture for fluid testing of hot gas manifolds wherein a fluid discharged during testing is directed via conduit means to a low noise, variable discharge area, split gate valve comprising:
- a valve housing having a fluid entrance opening and a larger fluid exit opening, said openings being aligned about a common axis;
- a pair of opposed, elongated recesses in said housing and disposed about said axis;
- facing gates movably disposed in each recess, and each having a forward edge provided with a radiused upstream region for smoothly accelerating fluid passing therebetween;
- means for moving each gate comprising a threaded opening in a rear wall thereof and a shaft threaded at one end and disposed for rotatably mating engagement with said threaded opening, said shaft being longitudinally fixed in and extending through a rear wall of said recess;
- indica means coupled to each said gate for providing a visual indication of distance of each said gate from said axis; and
- means for enabling smooth movement of said gates in said recesses comprising a spline fixed along each side of said recess and a mating groove in sides of said gates, and a sheet of material having a low coefficient of friction disposed under each said gate adjacent said exit opening, whereby, as said gates are moved in said recesses, support thereto is provided by said splines and said sheets.

* * * * *